US011921447B2

(12) United States Patent
Endo

(10) Patent No.: US 11,921,447 B2
(45) Date of Patent: Mar. 5, 2024

(54) HEATING DEVICE AND IMAGE PROCESSING DEVICE

(71) Applicant: TOSHIBA TEC KABUSHIKI KAISHA, Tokyo (JP)

(72) Inventor: Sasuke Endo, Chigasaki Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/874,635

(22) Filed: Jul. 27, 2022

(65) Prior Publication Data

US 2022/0365468 A1 Nov. 17, 2022

Related U.S. Application Data

(63) Continuation of application No. 17/167,367, filed on Feb. 4, 2021, now Pat. No. 11,429,045.

(30) Foreign Application Priority Data

Mar. 23, 2020 (JP) ................................ 2020-051384

(51) Int. Cl.
*G03G 15/20* (2006.01)

(52) U.S. Cl.
CPC ..... *G03G 15/2053* (2013.01); *G03G 15/2039* (2013.01); *G03G 15/2064* (2013.01)

(58) Field of Classification Search
CPC ........... G03G 15/2017; G03G 15/2025; G03G 15/2053; G03G 2215/2003
See application file for complete search history.

(56) References Cited

U.S. PATENT DOCUMENTS

| | | | |
|---|---|---|---|
| 6,049,064 A | 4/2000 | Natsuhara et al. |
| 2005/0006370 A1 | 1/2005 | Suzumi |
| 2009/0252521 A1 | 10/2009 | Takami |
| 2015/0139708 A1 | 5/2015 | Shimura et al. |
| 2015/0316881 A1 | 11/2015 | Aiba et al. |

(Continued)

FOREIGN PATENT DOCUMENTS

| | | |
|---|---|---|
| EP | 0838734 A2 | 4/1998 |
| JP | 2000039787 A | 2/2000 |
| JP | 2017116713 A | 6/2017 |

OTHER PUBLICATIONS

Extended European Search Report dated Aug. 10, 2021, mailed in counterpart European Application No. 21160228.9, 10 pages.

*Primary Examiner* — Thomas S Giampaolo, II
(74) *Attorney, Agent, or Firm* — Kim & Stewart LLP

(57) ABSTRACT

A heating device includes a cylindrical body with a hollow interior and a heater inside the hollow interior. A first surface of the heater faces the inner surface of the cylindrical body. A heat transfer member is on a second surface of the heater. A grease is between the heater and the heat transfer member. A support member is provided including a first portion fixed to the second surface of the heater and a second portion contacting a surface of the heat transfer member. The support member includes a third portion between the first and second portions. The third portion does not contact the second surface of the heater between the first and second portions and provides a space for grease from between the heater and the heat transfer member to accumulate.

20 Claims, 6 Drawing Sheets

(56) References Cited

U.S. PATENT DOCUMENTS

| | | | | |
|---|---|---|---|---|
| 2015/0338804 | A1* | 11/2015 | Nakashima | H05B 3/141<br>219/216 |
| 2016/0070225 | A1* | 3/2016 | Akiyama | H05B 1/0241<br>219/535 |
| 2016/0139551 | A1 | 5/2016 | Narahara et al. | |
| 2018/0004134 | A1 | 1/2018 | Nomura et al. | |
| 2018/0210380 | A1* | 7/2018 | Uchiyama | G03G 15/2042 |
| 2019/0113868 | A1* | 4/2019 | Akizuki | G03G 15/2064 |
| 2019/0286026 | A1* | 9/2019 | Furuichi | G03G 15/2053 |

* cited by examiner

HEATING DEVICE AND IMAGE PROCESSING DEVICE

CROSS-REFERENCE TO RELATED APPLICATIONS

This application is a continuation of U.S. patent application Ser. No. 17/167,367, filed on Feb. 4, 2021, which is based upon and claims the benefit of priority from Japanese Patent Application No. 2020-051384, filed on Mar. 23, 2020, the entire contents of each of which are incorporated herein by reference.

FIELD

Embodiments described herein relate generally to a heating device and an image processing device incorporating a heating device.

BACKGROUND

An image forming device which forms an image on a sheet of paper, or the like, is known. Such an image forming device may include a fixing device. The fixing device heats toner (recording agent) disposed on the sheet and thus fixes the toner on the sheet. Some fixing devices include a rotating drum or tube (tubular film). A heater unit in the fixing device can abut on an inner surface of the drum or the like. Such a fixing device needs to exhibit high reliability over time.

DETAILED DESCRIPTION

According to one embodiment, a heating device includes a cylindrical body extending in an axial direction and having a hollow interior region. A heater is inside the hollow interior region of the cylindrical body. The heater has a longitudinal direction that is parallel to the axial direction of the cylindrical body. A first surface of the heater faces an inner surface of the cylindrical body. A heat transfer member is on a second surface of the heater. The second surface is on a side of the heater opposite of the first surface. A grease is disposed between the heater and the heat transfer member. A support member is provided including a first portion that is fixed to the second surface of the heater and a second portion contacting a surface of the heat transfer member. The heat transfer member is between the second portion and the heater. The support member includes a third portion that is between the first and second portions along the longitudinal direction. The third portion does not contact the second surface of the heater between the first portion and the second portion and provides a space for grease from between the heater and the heat transfer member to accumulate.

Hereinafter, a heating device and an image processing device of certain example embodiments will be described with reference to the drawings.

Figure 1:
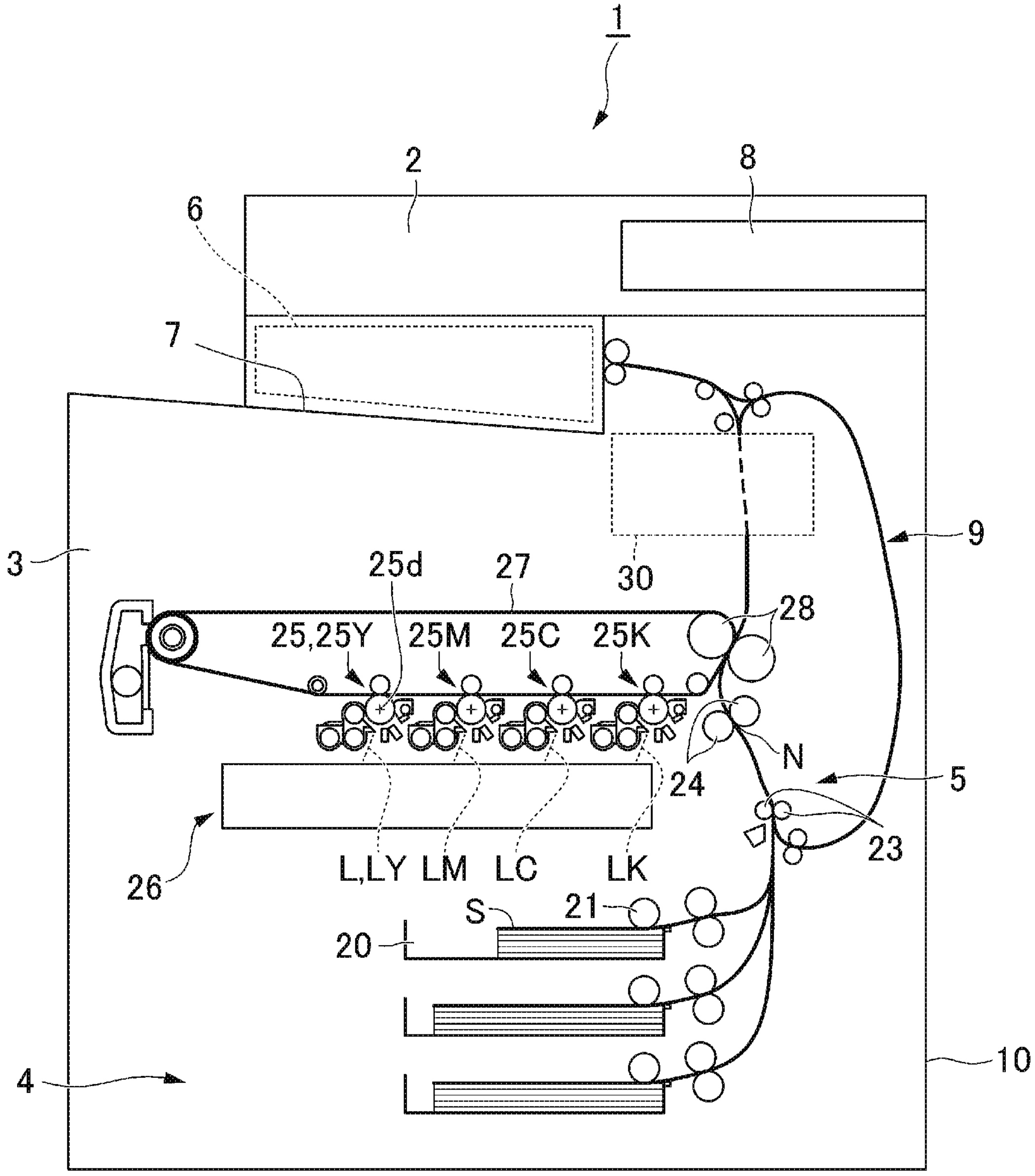
FIG. 1 is a schematic diagram of an image processing device according to an embodiment.

FIG. 1 is a schematic diagram of an image processing device of an embodiment. The image processing device of this embodiment is image forming device 1. The image forming device 1 performs a process of forming an image on a sheet S. The sheet S may be paper or the like.

The image forming device 1 includes a housing 10, a scanner portion 2, an image forming unit 3, a sheet supply portion 4, a conveyance portion 5, a paper output tray 7, an inversion unit 9 (reversing unit), a control panel 8, and a controller 6.

The housing 10, in general, provides the outer shape of the image forming device 1.

The scanner unit 2 reads image information from a document or other object to be copied. The scanner unit 2 reads image information as light and dark reflections from the document/object and generates an image signal accordingly. The scanner portion 2 outputs the generated image signal to the image forming unit 3.

In this embodiment, image forming unit 3 forms a toner image with a toner. In other examples, a recording agent other than toner may be used. The toner image is based on the image signal received from the scanner portion 2 or otherwise an image signal received from outside of the image forming device 10 (e.g., from an externally connected computer or the like). The image forming unit 3 transfers the toner image onto a surface of the sheet S. The image forming unit 3 then heats and presses the toner image on the sheet S to fix the toner image to the sheet S.

The sheet supply portion 4 supplies the sheets S, one by one, to the conveyance portion 5 at a timing to match or otherwise correspond with the toner image formed by the image forming unit 3. The sheet supply portion 4 has a sheet accommodation portion 20 and a pickup roller 21.

The sheet accommodation portion 20 stores sheets S of a predetermined size and type, for example.

The pickup roller 21 takes out the sheets S from the sheet accommodation portion 20 one by one. The pickup roller 21 supplies each sheet S to the conveyance portion 5.

The conveyance portion 5 conveys the sheet S from the sheet supply portion 4 to the image forming unit 3. The conveyance portion 5 has a conveyance roller pair 23 and a registration roller pair 24.

The conveyance roller pair 23 conveys the sheets S from the pickup roller 21 to the registration roller pair 24. The conveyance roller pair 23 positions the tip (leading edge) of a sheet S against a nip N formed by the registration roller pair 24.

The registration roller 24 halts the sheet S at the nip N to adjust the position (travel timing) of the sheet S along the conveyance direction. The registration roller pair 24 then conveys the sheet S through the nip N at a time appropriate to meet the toner image formed by the image forming unit 3 for transfer of the toner image to the sheet S.

The image forming unit 3 includes a plurality of image forming portions 25. The image forming unit also includes a laser scanning unit 26, an intermediate transfer belt 27, a transfer portion 28, and a fixing device 30.

Each image forming portion 25 has a photoconductor drum 25*d*. The image forming units 25 form a toner image corresponding to the image signal from the scanner unit 2 (or received from outside the image forming device 1) on the respective photoconductor drums 25*d*. Image forming portions 25Y, 25M, 25C, and 25K are provided in the image forming device 1 to form toner images, respectively, with yellow toner, magenta toner, cyan toner, and black toner.

In each image forming unit 25, a charger, a developing device, and the like are arranged around the photoconductor drum 25*d*. The charger electrostatically charges the surface of the photoconductor drum 25*d*. The developing device of each image forming unit 25 stores and supplies developer containing toner of one of the toner colors yellow, magenta, cyan, and black. The developing device provides toner for developing an electrostatic latent image formed on the photoconductor drum 25*d*. As a result, a toner image is formed on the photoconductor drum 25*d*.

The laser scanning unit 26 scans a laser beam L over the surface of the electrostatically charged photoconductor drum 25*d*. The laser beam L selectively exposes the surface of the photoconductor drum 25*d* in accordance with the image signal to form an electrostatic latent image thereon. In this example, the laser scanning unit 26 exposes the photoconductor drums 25*d* of each image forming portions 25Y, 25M, 25C, and 25K with different laser beams LY, LM, LC, and LK. As a result, the laser scanning unit 26 cam forms a different electrostatic latent image on each of the photoconductor drums 25*d* to correspond to the different colors in the image signal.

The toner image formed (developed) on the surface of the photoconductor drum 25*d* is then transferred (referred to as a primary transfer process) to the intermediate transfer belt 27.

The transfer portion 28 then transfers (referred to as a secondary transfer process) the toner images on the intermediate transfer belt 27 to the sheet S at a secondary transfer position.

The fixing device 30 then heats and presses the toner image on the sheet S to fix the toner image on the sheet S.

The inversion unit 9 can be used to reverse the sheet S in order to form an image on the back surface of the sheet S. The inversion unit 9 flips the sheet S discharged from the fixing device 30 by a switchback mechanism or the like. The inversion unit 9 then conveys the inverted sheet S back to the registration roller pair 24.

A printed sheet S (a sheet on which an image has been formed) can be discharged to the paper output tray.

The control panel 8 is for inputting information for an operator to operate the image forming device 1. The control panel 8 can be a touch panel and/or various buttons, hard keys, or the like.

The controller 6 controls each portion of the image forming device 1.

Figure 2:
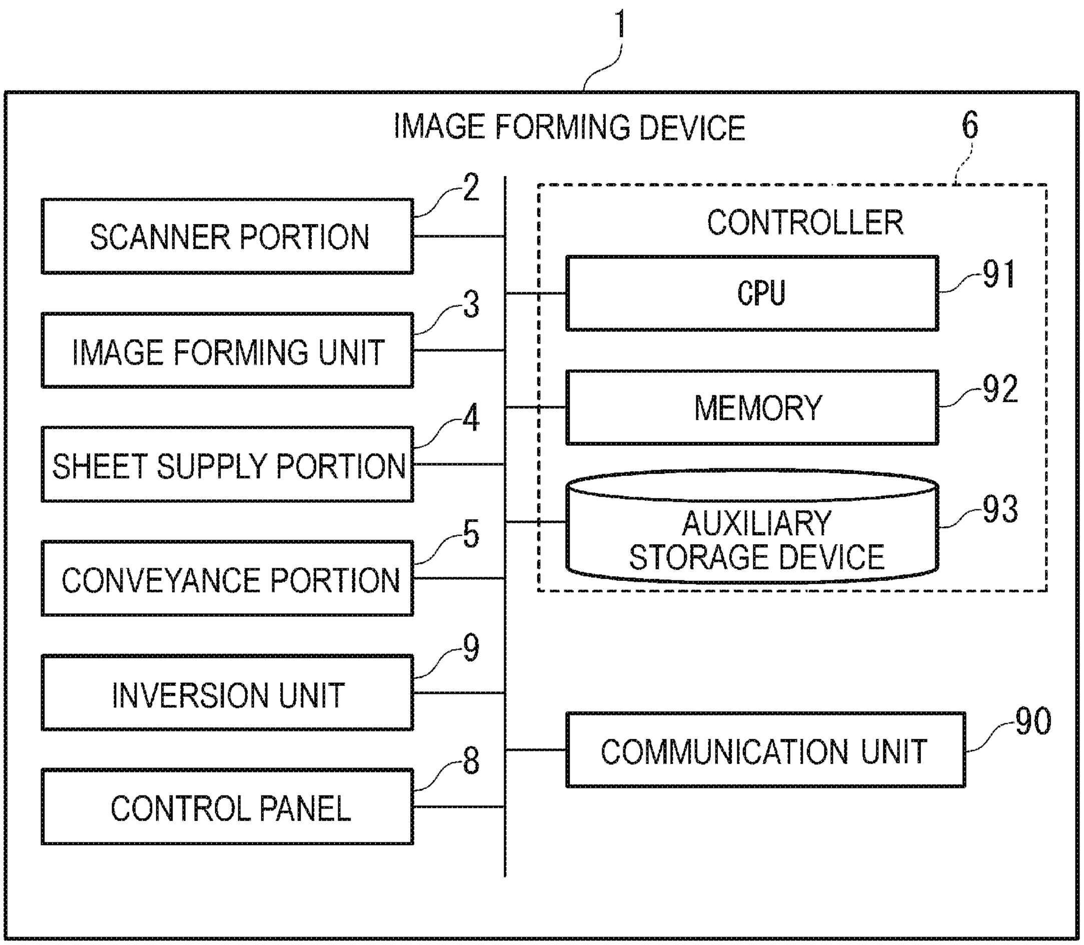
FIG. 2 is a hardware block diagram of an image processing device according to an embodiment.

FIG. 2 is a hardware block diagram of the image processing device of an embodiment. The image forming device 1 includes a Central Processing Unit (CPU) 91, a memory 92, an auxiliary storage device 93, and the like connected by a bus. The CPU 91 is configured to execute a software program. By execution of the program, the image forming device 1 performs various functions associated with operations of the scanner portion 2, the image forming unit 3, the sheet supply portion 4, the conveyance portion 5, the inversion unit 9, the control panel 8, and communication unit 90.

The CPU 91 executes programs stored in the memory 92 and the auxiliary storage device 93. As depicted, controller 6 includes CPU 91, memory 92, and auxiliary storage device 93 and controls the operations of the functional portions of the image forming device 1.

The auxiliary storage device 93 is a storage device such as a magnetic hard disk device or a semiconductor storage device. The auxiliary storage device 93 stores information.

The communication unit 90 includes a communication interface for connecting the image forming device 1 to an external device. The communication unit 90 communicates with the external device via the communication interface.

Figure 3:
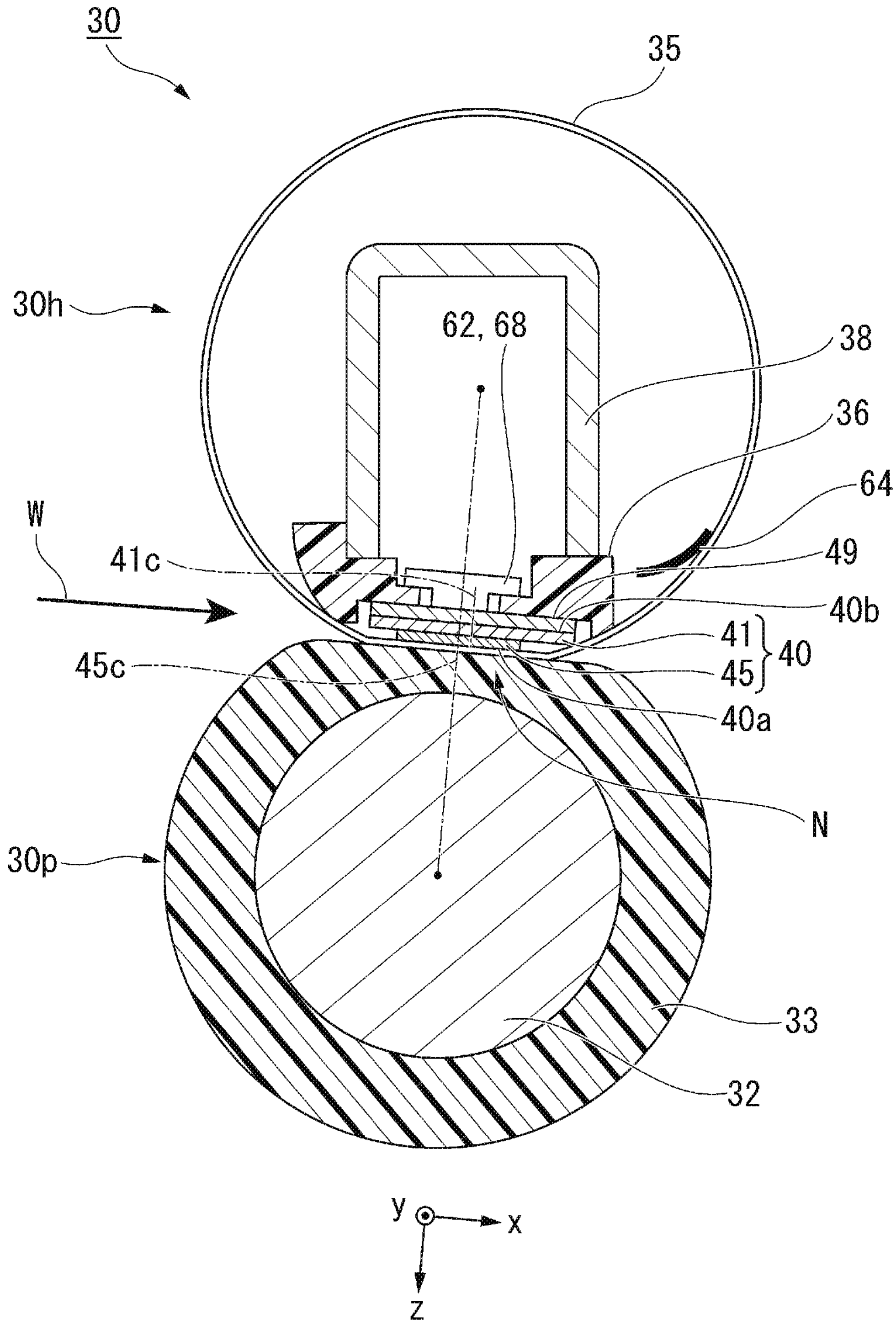
FIG. 3 is a cross-sectional view of a heating device of an embodiment.

FIG. 3 is a cross-sectional view of a heating device of an embodiment. The heating device of the present embodiment is the fixing device 30. The fixing device 30 includes a pressure roller 30*p* and a film unit 30*h*.

The pressure roller 30*p* forms nip N with the film unit 30*h*. The pressure roller 30*p* presses the toner image on the sheet S that pass through the nip N. The pressure roller 30*p* rotates on its axis and conveys the sheet S through the nip N. The pressure roller 30*p* has a core metal 32, an elastic layer 33, and a release layer (not separately illustrated).

The core metal 32 is formed in a columnar shape (e.g., a metal bar or rod) by a metal material such as stainless steel. Both ends of the core metal 32 in an axial direction are supported in a manner to permit rotation of the core metal 32 (more particularly to permit the pressure roller 30*p* to be rotated about its axis). The core metal 32 is rotationally driven by a motor or the like. The core metal 32 contacts a cam member or the like. When the cam member is rotated, the core metal 32 approaches towards (pressure roller 30*p* engages) or separates (pressure roller 30*p* disengages) from the film unit 30*h*.

The elastic layer 33 is formed of an elastic material such as silicone rubber. The elastic layer 33 is formed with a constant thickness on an outer peripheral surface of the core metal 32.

The release layer is a resin material such as tetrafluoroethylene-perfluoroalkyl vinyl ether copolymer (PFA). The release layer is formed as thin film or coating on the outer peripheral surface of the elastic layer 33.

The hardness of the outer peripheral surface of the pressure roller 30*p* is preferably set to 40° to 70° under a load of 9.8 N when measured with an ASKER-C hardness tester. With such a hardness, the contact area of the nip N and the durability of the pressure roller 30*p* are ensured.

When the pressure roller 30*p* into proximity with the film unit 30*h* and pressed against the film unit 30*h* by a pressure spring or the like, the nip N is formed. The pressure roller 30*p* is rotationally driven by a motor and rotates on its axis. When the pressure roller 30*p* rotates while engaged with the film unit 30*h* in a state in which the nip N is formed, tubular film 35 of the film unit 30*h* is driven to rotate by the rotation of the pressure roller 30*p*. Thus, when pressure roller 30*p* rotates while a sheet S is in the nip N, the sheet S will be conveyed in the conveyance direction W (arrow W in FIG. 3).

The film unit 30*h* heats the toner image present on the sheet S while the sheet passes through the nip N. The film unit 30*h* includes the tubular film 35, a heater unit 40, a heat transfer member 49, a support member 36, a stay 38, a heater sensor 62, a thermostat 68, and a film sensor 64.

The tubular film 35 has a tubular shape. The tubular film 35 may be referred to in some instances as a belt, a drum, a cylinder, a cylindrical body, a fixing belt, a fixing drum, a heating belt, a heating drum, a heating cylinder, or the like. The tubular film 35 has abase layer, an elastic layer, and a release layer in this order from the inner peripheral side. The base layer is a material such as nickel (Ni). The elastic layer is laminated on the outer peripheral surface of the base layer. The elastic layer is an elastic material such as silicone rubber. The release layer is on the outer peripheral surface of the elastic layer. The release layer is a material such as PFA resin.

The heater unit 40 is arranged inside the tubular film 35.

Figure 4:
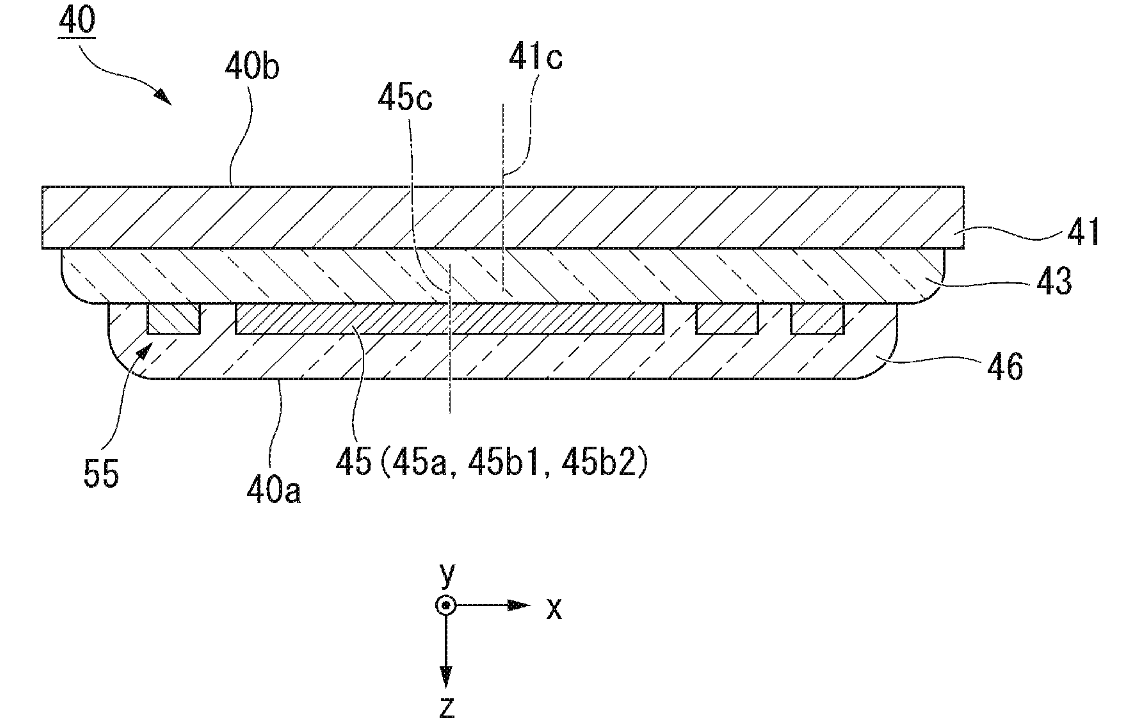
FIG. 4 is a cross-sectional view of a heater unit of an embodiment.
Figure 5:
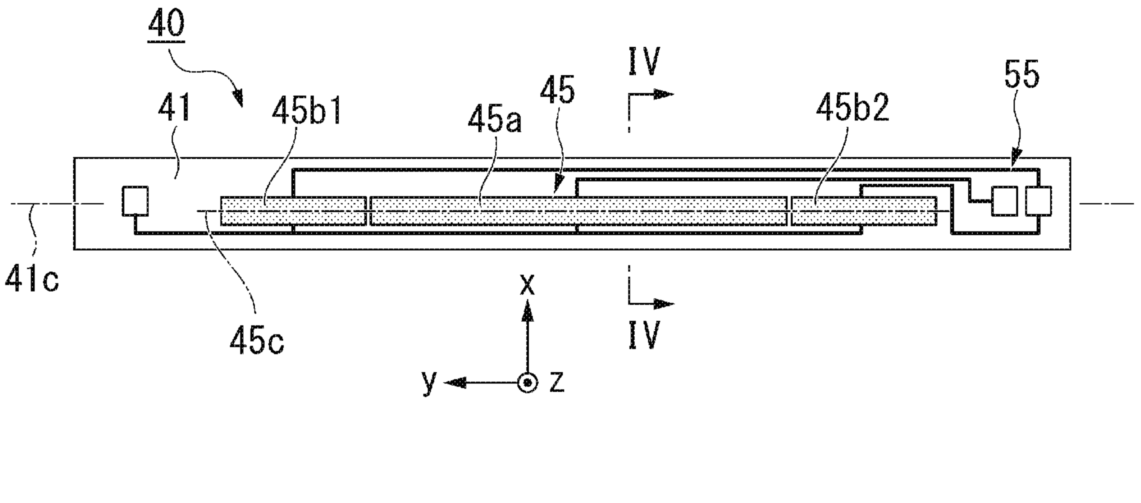
FIG. 5 is a bottom view of a heater unit of an embodiment.

FIG. 4 is a cross-sectional view of the heater unit 40 taken along the line IV-IV of FIG. 5. FIG. 5 is a bottom view (viewed from a +z direction) of the heater unit. The heater unit 40 includes a heating element substrate 41 (for simplicity, "substrate 41"), a heating element 45, and wiring group 55.

The substrate 41 is a metal material, such as stainless steel, or a ceramic material, such as aluminum nitride. The substrate 41 is formed in the shape of an elongated rectangular plate. The substrate 41 is positioned on the inner radial side of the tubular film 35. The axial direction of the tubular film 35 is parallel to the longitudinal direction (y direction in FIG. 5) of the substrate 41.

In this context of the fixing device 30, the x direction, y direction, and z direction are defined as follows. The y direction is the longitudinal (length) direction of the substrate 41. The +y direction is set to be the direction from the central heating element 45*a* to a first end heating element 45*b*1. The x direction is the lateral (width) direction of the substrate 41. The x direction is set to be parallel to the sheet conveyance. The +x direction is the conveyance direction (the direction to the downstream side of the substrate 41) for the sheet S. The z direction is the direction normal to surface of the substrate 41 on which the heating element 45 is disposed or otherwise arranged. The +z direction is the direction in which the heating element set 45 faces from the substrate 41 towards the pressure roller 30*p*. An insulating layer 43 is formed on the +z direction facing surface of the substrate 41 by a glass material or the like.

The heating element 45 is arranged on the substrate 41 as illustrated in FIG. 5. The heating element 45 is formed of a silver-palladium alloy or the like. The outer shape of the heating element 45 is formed in a rectangular shape with the y direction as the longitudinal direction and the x direction as the lateral direction. The heating element 45 has a center 45*c*. The center 45*c* is in the middle of the heating element 45 along the width direction (x direction). The center 45*c* of the heating element 45 is offset (to the −x direction) from the center 41*c* of the substrate 41 along the width direction (x direction). The center 41*c* of the substrate 41 corresponds in position to the center of the heater unit 40 along the x direction.

The heating element 45 comprises a plurality of individual heating elements 45*b*1, 45*a*, 45*b*2 arranged along the y direction (length) of the substrate 41. The heating element 45 includes a first end heating element 45*b*1, a central heating element 45*a*, and a second end heating element 45*b*2 arranged side by side in the stated order along the y direction. The central heating element 45*a* is at the center of the heating element 45 in the y direction. The first end heating element 45*b*1 is to the +y direction side of the central heating element 45*a* and is at the +y direction end of the heating element 45. The second end heating element 45*b*2 is to the −y direction side of the central heating element 45*a* and is at the −y direction end of the heating element 45.

The portions of the heating element 45 generate heat when energized (that is, when supplied with power). A sheet S having a relatively small width in the y direction is generally positioned so as to pass through the central portion (in the y direction) of the fixing device 30. In this case, the controller 6 heats (energizes) only the central heating element 45*a* for fixing operations. On the other hand, the controller 6 must heat (energize) the entire heating element 45 when a relatively wide (in the y direction) sheet S is being fixed. To provide for different sheet S widths, the central heating element 45*a*, the first end heating element 45*b*1, and the second end heating element 45*b*2 can be independently controllable from of each other to permit different active heating widths. Generally, the first end heating element 45*b*1 and the second end heating element 45*b*2 are similarly controlled as one another to generate heat.

As illustrated in FIG. 4, the heating element 45 and wiring group 55 are formed on the +z direction surface side of an insulating layer 43. A protective layer 46 is formed of a glass material or the like so as to cover the heating element 45 and the wiring group 55. The protective layer 46 functions to reduce friction (improve slidablity) or the like between the heater unit 40 and the tubular film 35.

Similar to the insulating layer 43 formed on the +z facing direction of the substrate 41, an insulating layer may be formed on the −z facing direction of the substrate 41. Similar to the protective layer 46 formed on the +z facing direction of the substrate 41, a protective layer may be formed on the −z facing direction of the substrate 41. By forming similar films on both sides of the substrate 41, warping of the substrate 41 can be suppressed.

The heat transfer member 49 is formed of a metal material having high thermal conductivity such as copper. As illustrated in FIG. 3, the width of the heat transfer member 49 in the x direction is equivalent to the width of the heater unit 40 in the x direction. The heat transfer member 49 is arranged on the side (−z direction) of a second surface 40*b* opposite to a first surface 40*a* of the heater unit 40.

The support member 36 is formed of a resin material such as a liquid crystal polymer. The support member 36 is arranged so as to cover the heater unit 40 on the −z direction facing side with the heat transfer member 49 interposed therebetween. The support member 36 supports the heater unit 40 and the heat transfer member 49. The support member 36 is arranged so as to cover each of the x direction sides of the heater unit 40. The support member 36 supports the inner peripheral surface of the tubular film 35 to both x direction sides of the heater unit 40.

When the heater unit 40 heats a sheet S passing through the fixing device 30, a temperature distribution is generated within the heater unit 40 according to the size of the sheet S. If the heater unit 40 becomes locally hot, it may exceed the heat resistance temperature of the support member 36, which can be formed of a resin material. The heat transfer member 49 functions to average the temperature distribution across the heater unit 40. The serves to prevent, the heat resistance of the support member 36 from being exceeded.

The stay 38 is formed of a steel plate material or the like. The cross section of the stay 38 perpendicular to the y direction is formed in a U shape. The stay 38 is mounted on the −z direction side of the support member 36. The open end of the U shape facing towards the support member 36. The stay 38 extends in the y direction. Both ends of the stay 38 in the y direction are fixed to the housing of the image forming device 1 or the like. As a result, the film unit 30*h* is structurally supported by the image forming device 1.

The heater sensor 62 is arranged to the −z direction side of the heater unit 40 with the heat transfer member 49 interposed therebetween. For example, the heater sensor 62 is a thermistor. The heater sensor 62 is mounted and supported on the −z direction surface of the support member 36. The heater sensor 62 comes into contact with the heat transfer member 49 through a hole which penetrates the support member 36 in the z direction. The heater sensor 62 measures the temperature of the heater unit 40 via the heat transfer member 49.

The thermostat 68 is arranged in the same manner as the heater sensor 62. The thermostat 68 operates to cut off the energization of the heating element 45 if the temperature of the heater unit 40 detected via the heat transfer member 49 exceeds a predetermined temperature.

The film sensor 64 is arranged to be inside the tubular film 35 and to the +x direction side of the heater unit 40. The film sensor 64 contacts the inner peripheral surface of the tubular film 35 and measures the temperature of the tubular film 35.

The grease utilized in the fixing device 30 will be described.

Figure 6:
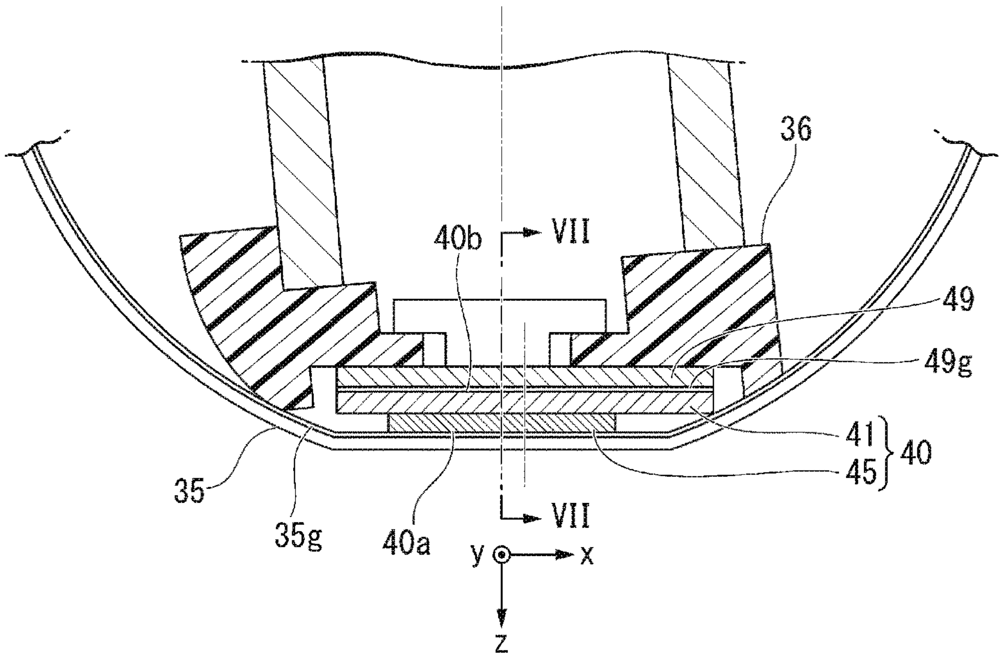
FIG. 6 is an enlarged view of a cross-sectional view of a heating device of an embodiment depicting aspects of a heater unit.

FIG. 6 is an enlarged view around the fixing device 30. The fixing device 30 has a first grease 49*g* and a second grease 35*g* applied therein.

The second grease 35*g* is disposed on the entire inner surface of the tubular film 35. The first surface 40*a* of the heater unit 40 in the +z direction comes into contact with the inner surface of the tubular film 35 via the second grease 35*g*. The second grease 35*g* is a fluorine grease, that is a grease based on a fluorine oil. Fluorine grease has characteristics such as high heat resistance, low friction, and long life. When the heater unit 40 generates heat, the viscosity of the second grease 35*g* decreases as a result. Therefore, friction between the heater unit 40 and the tubular film 35 is reduced.

The first grease 49*g* is disposed between the heater unit 40 and the heat transfer member 49. The second surface 40*b* (−z direction facing surface) of the heater unit 40 contacts the heat transfer member 49 via the first grease 49*g*. The first grease 49*g* is a highly heat conductive grease typically containing a heat conductive filler or the like. The first grease 49 is utilized because there are generally irregularities on the contact surfaces of the heater unit 40 and the heat transfer member 49 that might otherwise prevent full contact between these surfaces. In particular, if a glass layer is formed on the second surface 40*b* of the heater unit, large irregularities tend to be on the surface of this glass layer. The first grease 49*g* functions to fill the surface irregularities so that the heat transfer between the heater unit 40 and the heat transfer member 49 is improved. In some examples, the first grease 49*g* may be the same fluorine grease as the second grease 35*g*.

Figure 7:
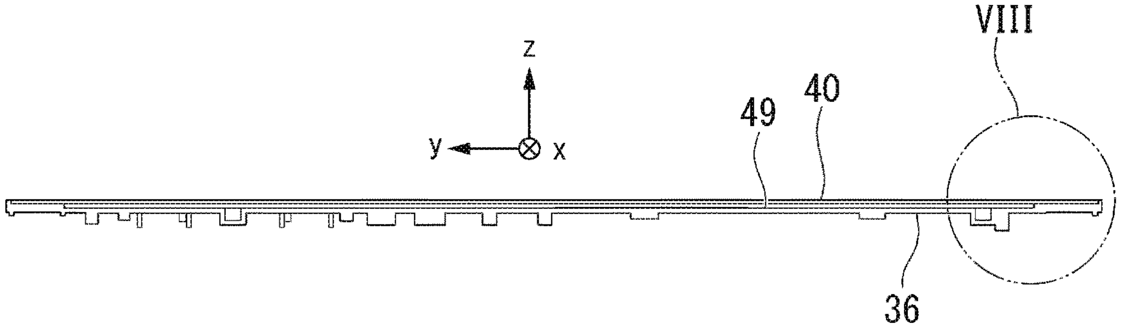
FIG. 7 is another cross-sectional view depicting aspects of a heater unit.
Figure 8:
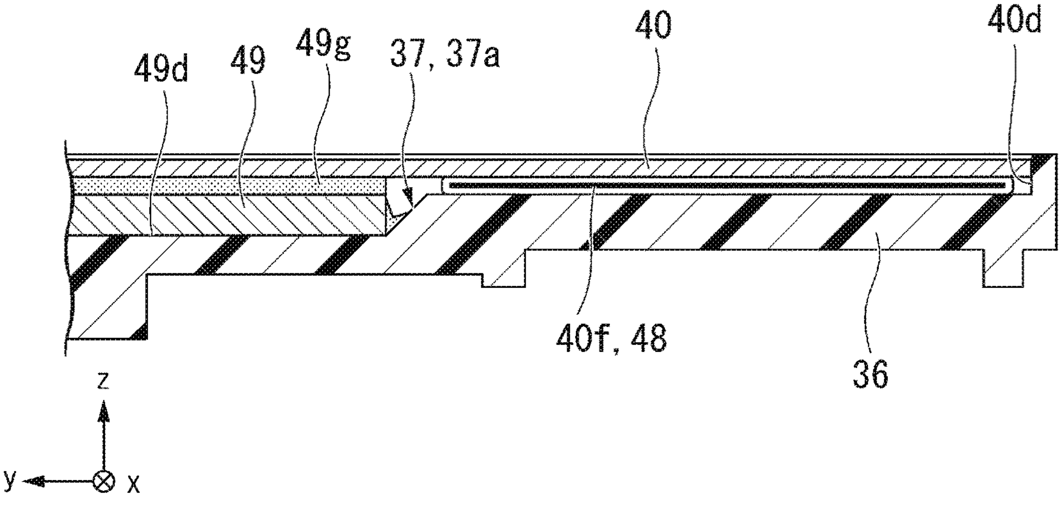
FIG. 8 is an enlarged view of a cross-sectional view depicting aspects of a heater unit.

FIG. 7 is a cross-sectional view of the fixing device 30 at the line VII-VII of FIG. 6. FIG. 8 is an enlarged view of a portion labeled VIII of a cross section of the fixing device 30 in FIG. 7. As illustrated in FIG. 7, the support member 36 is longer in the y direction than the heater unit 40, and the heater unit 40 is longer in the y direction than the heat transfer member 49. The heater unit 40 extends beyond the heat transfer member 49 in both the +y direction and the −y direction.

As illustrated in FIG. 8, the heater unit 40 is accommodated in a first recess portion 40*d* of the support member 36. The first recess portion 40*d* is formed on the +z direction surface of the support member 36. The heater unit 40 is fixed to the support member 36 at a fixed portion 40*f*. The fixed portion 40*f* is positioned to be outside (beyond) the heat transfer member 49 in the y direction. A fixing member 48, such as double-sided tape or an adhesive, can be arranged on the fixing portion 40*f*.

The heat transfer member 49 is accommodated in a second recess portion 49*d* of the support member 36. The second recess portion 49*d* is formed on the bottom surface of the first recess portion 40*d*. The heat transfer member 49 is interposed and supported between the heater unit 40 and the support member 36 in the z direction. The heat transfer member 49 may be fixed to the bottom surface of the second recess portion 49*d* of the support member 36.

The support member 36 has a non-contact portion 37. This non-contact portion 37 is a portion of the support member 36 that does not come into contact with the heater unit 40. A space exists between the heater unit 40 and the support member 36 at the non-contact portion 37. The width of the non-contact portion 37 in the x direction is equivalent to the width of the first recess portion 40*d* and the second recess portion 49*d* in the x direction. The non-contact portion 37 is between the heat transfer member 49 and the fixed portion 40*f* in the y direction.

In this example, the non-contact portion 37 is a chamfered portion 37*a* formed at an opening edge portion of the second recess portion 49*d*. The chamfered portion 37*a* is formed at a corner between the side surface of the second recess portion 49*d* and the bottom surface of the first recess portion 40*d*. The chamfered portion 37*a* is uniformly formed along the x direction. The chamfered portion 37*a* continuously increases the cross-sectional area of the support member 36 from the end of the second recess portion 49*d* towards the outward direction (in the −y direction) of the support member 36.

The heater unit 40 and the heat transfer member 49 are attached to the support member 36 as follows. The heat transfer member 49 is disposed on the −z direction surface of the heater unit 40 via the first grease 49*g*. The fixing member 48 is arranged on the fixing portion 40*f*. The heater unit 40 is inserted into the first recess portion 40*d* and the heat transfer member 49 is then inserted into the second recess portion 49*d*. The heater unit 40 is pressed and fixed by the support member 36 at the fixing portion 40*f*.

When the heater unit 40 is pressed by the support member 36, the heat transfer member 49 is also pressed by the support member 36. The first grease 49*g* arranged between the heater unit 40 and the heat transfer member 49 will tend to be extruded to the outside of the heat transfer member 49. The non-contact portion 37 is left between the heat transfer member 49 and the fixed portion 40*f*. Thus, a space exists between the heater unit 40 and the support member 36 at the non-contact portion 37. The first grease 49*g* extruding to the outside of the heat transfer member 49 can be accommodated in the non-contact portion 37. Therefore, the intrusion of the first grease 49*g* into the fixed portion 40*f* can be suppressed. As a result, the heater unit 40 can be more firmly fixed to the support member 36 at the fixing portion 40*f*.

As described above, the fixing device 30 of the embodiment has the tubular film 35, the heater unit 40, the heat transfer member 49, the first grease 49*g*, and the support member 36. The heater unit 40 is arranged inside the tubular film 35. The heater unit 40 has the axial direction of the tubular film 35 as the longitudinal direction. In the heater unit 40, the first surface 40*a* abuts on the inner surface of the tubular film 35. The heat transfer member 49 is arranged on the second surface 40*b* side opposite to the first surface 40*a* of the heater unit 40. The first grease 49*g* is between the heater unit 40 and the heat transfer member 49. The support member 36 is arranged on the opposite side of the heater unit 40 with the heat transfer member 49 interposed therebetween. The support member 36 is fixed to the heater unit 40 at the fixing portion 40*f* outside the heat transfer member 49 in the longitudinal direction. The support member 36 has the non-contact portion 37 which is provides a space, gap, or void between the heat transfer member 49 and the fixed portion 40*f*.

When the heater unit 40 and the heat transfer member 49 are attached to the support member 36, the first grease 49*g* can be pressed and caused to extrude to the outside of the heat transfer member 49. The non-contact portion 37 between the heat transfer member 49 and the fixed portion 40*f* serves to accommodate the first grease 49*g* that might be extruded from the heat transfer member 49. As a result, the intrusion of the first grease 49*g* into the fixed portion 40*f* is suppressed. The heater unit 40 can thus be more firmly fixed to the support member 36 at the fixing portion 40*f*. Therefore, the possibility of separation of the heater unit 40 from the support member 36 is suppressed. As a result, the fixing device 30 can exhibit high reliability.

The support member 36 has the second recess portion 49*d* in which the heat transfer member 49 is accommodated. The non-contact portion 37 is the chamfered portion 37*a* formed at the opening edge of the second recess portion 49*d*.

The chamfered portion 37*a* is arranged to be adjacent to the heat transfer member 49. The first grease 49*g* accommodated in the chamfered portion 37*a* can serve as a reservoir permitting grease to be re-supplied to the interface between the heat transfer member 49 and the heater unit 40. As a result, decreases in the heat transfer between the heater unit 40 and the heat transfer member 49 can be suppressed.

In the present example, the chamfered portion 37*a* continuously changes the cross-sectional area of the support member 36. As a result, a decrease in the rigidity of the support member 36 is reduced.

When the heat transfer member 49 is inserted into the second recess portion 49*d*, the chamfered portion 37*a* also helps to guide the heat transfer member 49 to a predetermined installation position. As a result, the positional accuracy of the placement of the heat transfer member 49 is improved.

A first modification example of the embodiment will be described.

Figure 9:
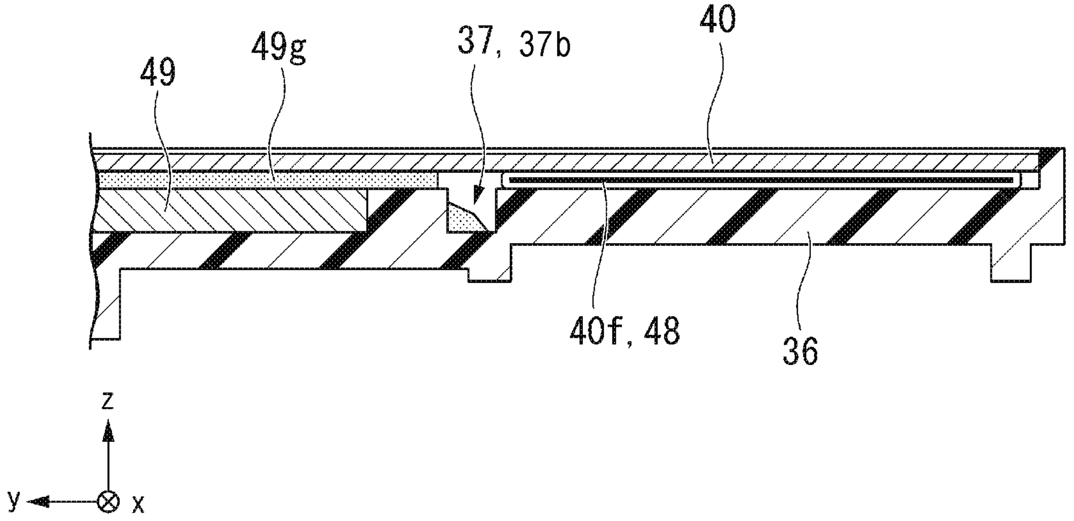
FIG. 9 is an enlarged view of a cross-sectional depicting aspects of a heater unit in a heating device of a first modification example.

FIG. 9 is an enlarged view of a cross section of a heater unit in a heating device of a first modification example of the embodiment. FIG. 9 is an enlarged view of a portion corresponding to the VIII portion of FIG. 7. Other than the specific aspects described in the following for the first modification example, the other aspects are substantially the as those described for in the previous embodiment and thus description of such repeated aspects will be omitted.

The non-contact portion 37 of the first modification example is a groove portion 37*b* extending in the x direction. The length of the groove portion 37*b* in the x direction is equivalent to the width of the first recess portion 40*d* and the second recess portion 49*d* in the x direction. The groove portion 37*b* is formed on the bottom surface of the first recess portion 40*d*. The depth of the groove portion 37*b* is substantially constant along its length in the x direction. For example, the depth of the groove portion 37*b* is equal to the depth of the second recess portion 49*d*.

The first grease 49*g* extruding from the heat transfer member 49 spreads outward direction through a gap left between the heater unit 40 and the support member 36. In the groove portion 37*b*, there is a relatively wide space (void) between the heater unit 40 and the support member 36. The spreading first grease 49*g* can be accommodated in the groove portion 37*b*. As a result, the intrusion of the first grease 49*g* into the fixed portion 40*f* is suppressed. The heater unit 40 can thus be more firmly fixed to the support member 36 in the fixed portion 40*f*. The possible separation of the heater unit 40 from the support member 36 is suppressed. Therefore, the fixing device 30 can exhibit high reliability.

The groove portion 37*b* is positioned to be spaced apart from the heat transfer member 49 in they direction. The groove portion 37*b* is arranged to be adjacent (or nearly so) to the fixed portion 40*f*.

Since the side surface of the second recess portion 49*d* is directly adjacent to the heat transfer member 49 in they direction, the heat transfer member 49 can be firmly positioned in the y direction.

The image forming device 1 is one example of an image processing device of the present disclosure, and fixing device 30 is one example of a heating device of the present disclosure. In other examples, the image processing device may be a decolorizing device, and the heating device may be a decolorizing unit of a decoloring device. The decolorizing device performs a process of decolorizing (erasing) an image that was previously formed on a sheet using specialized decolorable toner. The decolorizing unit heats the decolorable toner image on a sheet that is passed through a nip or the like. By heating the decolorable toner the decolorizing unit decolorizes (erases) the previously printed image to decolorize the sheet.

According to at least one embodiment described above, the support member 36 has the non-contact portion 37 between the heat transfer member 49 and the fixed portion 40*f*. As a result, the fixing device 30 (or other heating device) can exhibit high reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A heating device, comprising:
- a cylindrical body extending in an axial direction;
- a heater inside the cylindrical body, the heater having a longitudinal direction parallel to the axial direction of the cylindrical body;
- a heat transfer member contacting a surface of the heater; and
- a support member having:
  - a first portion contacting the surface of the heater,
  - a recess accommodating the heat transfer member, the heat transfer member being between the recess and the heater in a direction orthogonal to the surface of the heater,
  - a space between the first portion and the recess along the longitudinal direction and between the heater and the support member in the direction orthogonal to the surface of the heater, and
  - an edge between the recess and the first portion, wherein the edge is chamfered, and
- the heat transfer member does not extend into the space.

2. The heating device according to claim 1, wherein a grease from between the heater and the heat transfer member can accumulate in the space.

3. The heating device according to claim 1, further comprising:
- an adhesive between the first portion of the support member and the heater.

4. The heating device according to claim 1, wherein the support member is a resin material.

5. The heating device according to claim 4, wherein the resin material is a liquid crystal polymer.

6. The heating device according to claim 1, further comprising:

a pressing roller configured to press against a portion of an outer peripheral surface of the cylindrical body and form a nip for a sheet at a position opposite the heater.

7. The heating device according to claim 1, wherein the heater comprises a plurality of heating elements spaced from each other along the longitudinal direction.

8. The heating device according to claim 7, further comprising:

a controller configured to control heating of heating elements in the plurality of heating elements independently from other heating elements in the plurality of heating elements.

9. The heating device according to claim 1, wherein the heater comprises a silver-palladium alloy.

10. An image processing device, comprising:

a plurality of rollers configured to convey a sheet;

a heating device configured to heat the sheet conveyed by the plurality of rollers, the heating device including:

a cylindrical body extending in an axial direction;

a heater inside the cylindrical body, the heater having a longitudinal direction parallel to the axial direction of the cylindrical body;

a heat transfer member contacting a surface of the heater; and a support member having:

a first portion contacting the surface of the heater, a recess accommodating the heat transfer member, the heat transfer member being between the recess and the heater in a direction orthogonal to the surface of the heater, a space between the first portion and the recess along the longitudinal direction and between the heater and the support member in the direction orthogonal to the surface of the heater, and an edge between the recess and the first portion, wherein the edge is chamfered, and the heat transfer member does not extend into the space.

11. The image processing device according to claim 10, wherein a grease from between the heater and the heat transfer member can accumulate in the space.

12. The image processing device according to claim 10, further comprising:

an image forming unit configured to form an image on the sheet conveyed by the plurality of rollers, wherein the heating device receives the conveyed sheet after the image has been formed on the sheet by the image forming unit.

13. The image processing device according to claim 12, wherein the image forming unit is configured to form the image on the sheet using toner.

14. The image processing device according to claim 10, further comprising:

an adhesive between the first portion of the support member and the heater.

15. The image processing device according to claim 10, wherein the support member is a resin material.

16. A fixing device, comprising:

a cylindrical body extending in an axial direction;

a heater inside the cylindrical body, the heater comprising a plurality of resistive heating elements, a longitudinal direction of the heater being parallel to the axial direction of the cylindrical body;

a heat transfer plate contacting a surface of the heater; and a support member having:

a first portion contacting the surface of the heater, a recess contacting the heat transfer plate, a space between the first portion and the recess along the longitudinal direction and between the heater and the support member in the direction orthogonal to the surface of the heater, and a chamfered portion bordering the space, wherein the heat transfer plate is between the recess and the heater, the heat transfer plate does not extend into the space between the first portion and the recess.

17. The fixing device according to claim 16, wherein a grease from between the heater and the heat transfer plate can accumulate in the space.

18. The fixing device according to claim 16, wherein the support member is a liquid crystal polymer.

19. The fixing device according to claim 16, further comprising:

a pressing roller configured to press against a portion of an outer peripheral surface of the cylindrical body and form a nip for a sheet at a position opposite the heater.

20. The fixing device according to claim 16, further comprising:

an adhesive between the first portion of the support member and the heater.

* * * * *